Feb. 17, 1953     L. H. TINKER     2,629,002
DEVICE FOR APPLYING TEST VOLTAGE TO PIPE COATING
Filed Nov. 30, 1950     2 SHEETS—SHEET 1

INVENTOR.
LEO H. TINKER
BY
Gerald H. Peterson
ATTORNEY.

Feb. 17, 1953 L. H. TINKER 2,629,002
DEVICE FOR APPLYING TEST VOLTAGE TO PIPE COATING
Filed Nov. 30, 1950 2 SHEETS—SHEET 2
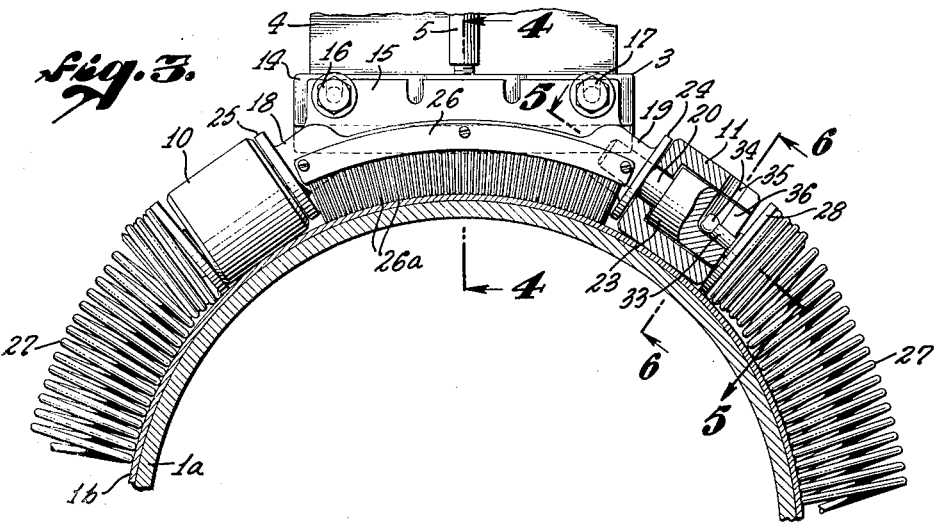
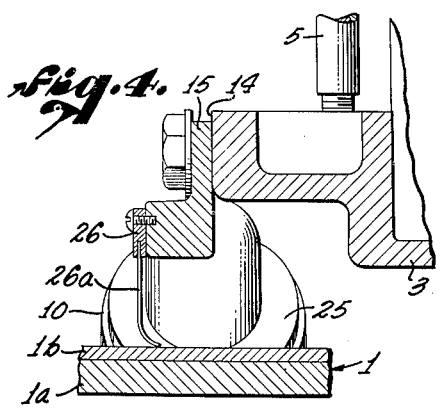
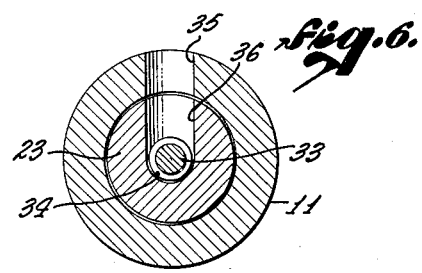
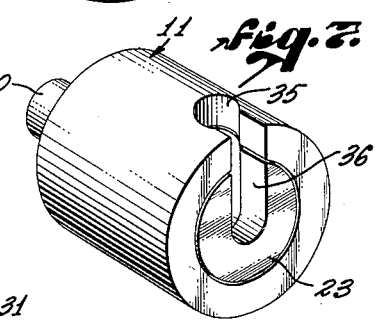
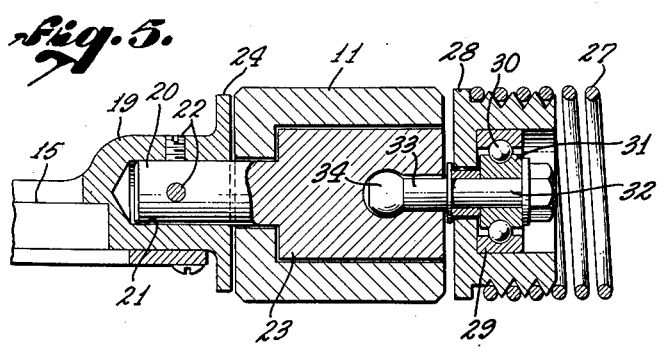
INVENTOR.
LEO H. TINKER
BY
*Gerald H. Peterson*
ATTORNEY.

Patented Feb. 17, 1953

2,629,002

UNITED STATES PATENT OFFICE 2,629,002

DEVICE FOR APPLYING TEST VOLTAGE TO PIPE COATING

Leo H. Tinker, San Gabriel, Calif.

Application November 30, 1950, Serial No. 198,255

14 Claims. (Cl. 175—183)

This invention relates to a device for testing pipe coating for defects known as "holidays," particularly relates to a device for applying the test voltage to the coating surface and along the pipe, and more particularly relates to a device which carries the electrical equipment producing the test voltage along the top of the pipe and applies the test voltage to the coating as it is moved along the pipe.

In the construction of pipe lines for transmitting and distributing natural gas, petroleum and water, it is common practice to coat the pipe, such as steel or other metal pipe, with a coating which may be one or more layers of tar and paper, for example, to protect the pipe from the corrosive effects of electrolysis due to cathodic currents developed between moist ground and the metal pipe. Other coatings such as an asphalt coating material, Somastic, pipe-line enamel, various plastic coatings, such as Amercoat plastic coating, a vinyl coating, particularly very thin coatings of plastic material, are used. In order to make sure that the coatings are adequate for protecting the metallic pipe from the corrosive effects of electrolysis, it is necessary to test the coatings with a device which will indicate any imperfections in the coatings through which water might penetrate and come in contact with the metal pipe after the pipe has been placed underground. These imperfections, called "holidays," are usually caused by minute openings in the coating which may be caused by air bubbles, shrinkage cracks, etc., or in the case of asphalt coating material, or tar coating material, by particles of coke or silica. Such imperfections are not readily visible or otherwise detected, but must be detected by a special device adapted therefor.

Devices for testing for such holidays in such coating preferably comprise an electrical apparatus capable of generating the high voltage used for test, which apparatus is preferably portable so that it can be moved along great length of pipe being tested, and a means for applying the test voltage to the coating, that is, an electrode for applying the test voltage to the coating. A preferred electrical apparatus for supplying such test voltage is described in the co-pending application of John P. Rasor, Serial No. 89,892, filed April 27, 1949.

This application relates particularly to a device for transporting or carrying the electrical apparatus for supplying the test voltage along the top of the pipe in combination with a means for applying the test voltage to the surface of the coating on the pipe as the electrical apparatus is moved along the pipe.

It is an object of this invention to provide a means which in combination transports or carries the high voltage electrical apparatus along the pipe and applies the test voltage to the coating at the same time.

Another object is to provide an arrangement whereby the electrode extending about the pipe may be disengaged therefrom and freed from extending about the pipe without being completely disengaged from the device for carrying the electrical apparatus.

Other objects and advantages of this invention will be apparent from the following description taken in conjunction with the accompanying drawing, in which:

Figure 3 is a fragmentary view taken on the line 3—3 of Figure 1.

Figure 4 is another fragmentary view taken on the line 4—4 of Figure 3.

Figure 5 is a cross-sectional view showing the arrangement for connecting an end of the coiled spring electrode to the roller of the carriage taken on the line 5—5 of Figure 3.

Figure 6 is a cross-sectional view of a roller taken on the line 6—6 of Figure 3.

Figure 7 is a perspective view of one of the rollers of the carriage showing the arrangement for connecting the electrode thereto.

Figure 1:
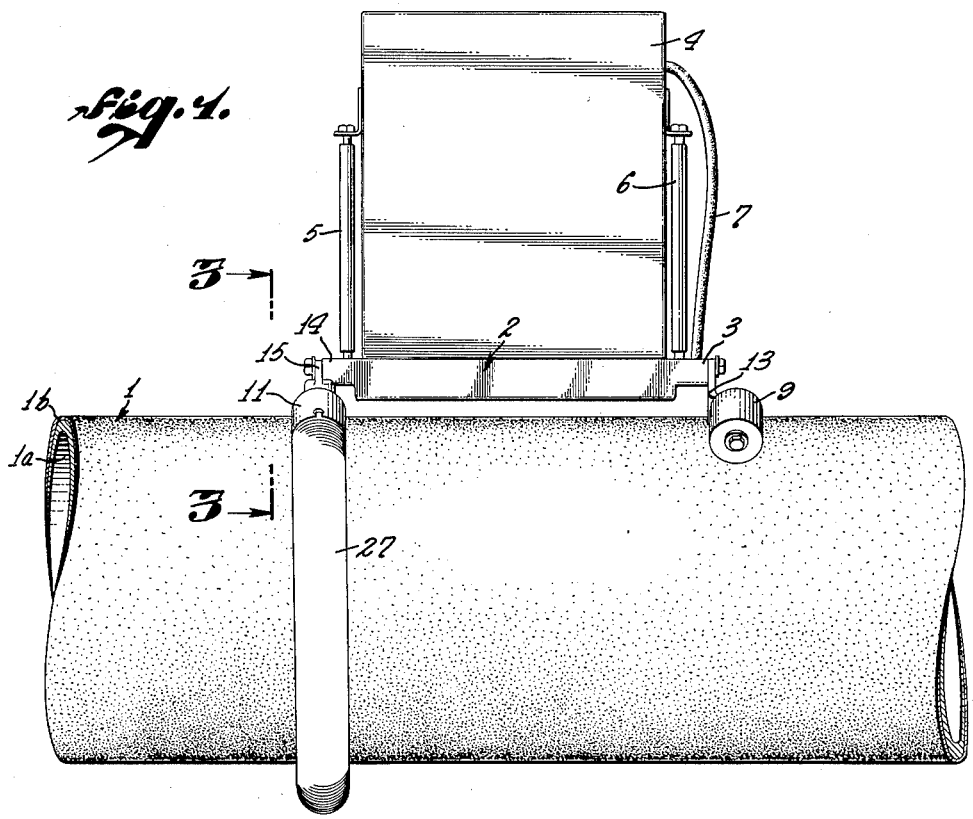
Figure 1 is a side elevation of the device of my invention mounted on a pipe with the electrode for applying the test voltage to the coating on the pipe extending thereabout.
Figure 2:
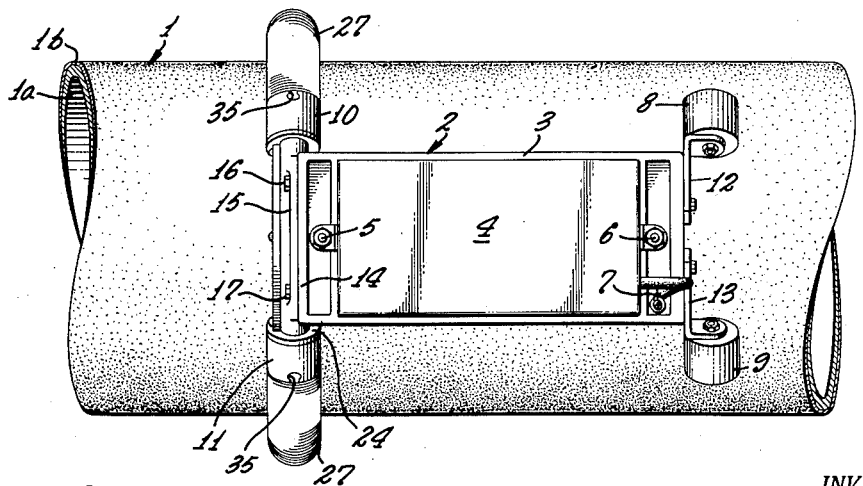
Figure 2 is a top plan view of the showing of Figure 1.

In accordance with one embodiment of my invention, it comprises in general a carriage having rollers and adapted to be moved along the top of a pipe on the rollers and to carry the electrical apparatus which supplies the test voltage preferably encased in a cabinet, the carriage having an electrode for applying the test voltage around the pipe and adapted to move along the pipe with the carriage with the rollers forming a part of said electrode and with a coiled spring electrode connected to and extending from the outward portion of each roller, and means between the rollers for applying the test voltage to the coating therebetween for any space on the coating between the rollers immediately under the carriage to which the rollers do not apply the test voltage. Means will also be provided for electrically connecting the test voltage to said means between the rollers, the rollers themselves and the coiled spring extending about the pipe between the outer portion of each roller. Moreover, preferably the coiled spring electrode may be readily engaged or disengaged from at least one of the rollers.

My invention will now be more particularly illustrated by the following description of a more specific embodiment taken in conjunction with the accompanying drawing.

In the drawings, at 1 is shown a coated pipe of metal 1a having coating 1b to be tested for holidays. At 2 is shown a carriage having an all metal electrical conducting platform member 3 adapted to carrying the electrical apparatus 4 which develops and supplies a high voltage for testing. This electrical apparatus 4 is fixed to the platform 3 of the carriage 2 by any convenient means such as bars 5 and 6. High potential electrical lead 7 is provided to connect the high voltage from the electrical apparatus 4 to the electrically conducting platform 3 of the carriage 2. Preferably the carriage 2 has two sets of rollers; one set 8 and 9 at the back end of the platform 3 and the other set 10 and 11 at the front end of the platform 3. The back rollers 8 and 9 may preferably be made of rubber or some other electrical insulating material so that the high voltage from platform 3 is not applied to the coating of the pipe through these back rollers. Rollers 8 and 9 are affixed to the carriage by means of brackets 12 and 13 respectively.

Supporting bracket 15 is affixed to the front end portion 14 of the platform 3 by means of bolts 16 and 17 and has two outwardly and downwardly extending portions 18 and 19 for carrying a shaft for each of rollers 10 and 11 such as shaft 20 for roller 11. These shafts are affixed in the portions 18 and 19 as shown for shaft 20 in portion 19 where shaft 20 is shown fixed in hole 21 by set screw 22. Roller 10 is mounted in the same manner as roller 11. Roller 11 fits about the enlarged portion 23 of shaft 20 and is free to rotate about this shaft. The roller is held in position between the enlarged portion 23 of shaft 20 and thrust bearing 24. Roller 10 has a similar thrust bearing 25. It will thus be seen that carriage 2 is adapted to roll along the top of the pipe on back rollers 8 and 9 and front rollers 10 and 11. All metal parts are used in connecting or fastening rollers 10 and 11 to the electrical conducting platform 3 so that both bracket 15 and rollers 10 and 11 carry the test voltage. Thus rollers 10 and 11 apply the test voltage to the surface of the coating over which they roll.

Extending between rollers 10 and 11 and fixed to bracket 15 is a frame member 26 carrying a comb-like structure of flexible wire elements 26a for applying the test voltage to the surface of the coating between rollers 10 and 11. In accordance with a modification of my device, not shown on the drawing, the two rollers 10 and 11 may be brought so close together that comb-like electrical contact means 26 may be omitted.

Extending from the outer side of one roller about the pipe and to the other side of the other roller is resilient coiled helical spring 27 for applying the test voltage to the surface of the coating extending between the outer portions of the roller. Each end of this coiled spring 27 is fixed to a collar member 28 fixed inside of which is an outer race 29 for ball bearings 30 having an inner race 31 on shaft 32 so that collar 28 and spring 27 are free to rotate about shaft 32.

Each shaft such as shaft 32 at each end of the spring 27 is provided with a projecting portion 33 having an enlarged head 34 adapted to be fitted through a correspondingly shaped slot 35 in roller 11 and into correspondingly shaped slot 36 in fixed shaft 20, when roller 11 is turned so that slot 35 coincides with slot 36. When projecting portion 33 is fitted into slot 36, it is locked in position but can be readily removed by again turning roller 11 to line up slots 36 and 35, thus each end of the spring can be readily connected to the fixed shaft such as 20 or disengaged as desired. It will be understood of course that the same arrangement for connecting and disengaging the end of coiled spring 27 to shaft 20 within roller 11 is provided for a fixed shaft similar to shaft 20 within roller 10 so that the spring may also in the same manner and by the same arrangement be connected or disengaged from the shaft within roller 10.

Instead of using two rollers 8 and 9, one roller, for example, such as a castor, may be used, although two rollers is preferable to help maintain the proper alignment and travel on top of the pipe. Also, by locating rollers 10 and 11 substantially under the center of gravity of their load, it is feasible to use just two such rollers, in which case the load carried by the rollers would be balanced by the operator. Also, instead of connecting the ends of the coiled spring as shown in Figures 3 and 5, the two ends of the coiled spring 27 may be affixed to rollers 10 and 11 respectively so that both rollers and spring turn as a unit.

In operation it will be understood that the electrical device 4 carries a ground so that by way of ground one side of the high voltage is connected to the interior metal portion 1a of the pipe. Through lead 7 the other side of the high voltage is led to the metal electrical conducting platform 3, and from 3 through the metal parts to the rollers 10 and 11, the comb-like electrical contact means 26, and the coiled spring 27, so that the two rollers, the comb 26, and the spring 27 completely encircle the pipe and apply the high voltage to the coating 1b so that the test voltage is applied across the coating and will detect holidays in a manner known in the art to which my invention relates. To apply the test voltage along the pipe my device is simply moved along the pipe, as by pushing, preferably with the electrode comprising rollers 10 and 11, comb 26, and coiled spring 27 in front. As my device moves along this electrode applies the test voltage to the surface of the coating completely about the pipe.

Thus my device provides a simple highly effective arrangement for both transporting the electrical equipment used for supplying the high voltage for test and at the same time an electrode for conveniently and satisfactorily applying the test voltage to the surface of the coating as the whole unit is rolled along the pipe. In addition, my device is exceedingly convenient because the coiled spring may be disengaged at either end, and only at one end with the other end still connected, so that the coiled spring may be readily disengaged from about the pipe and still be connected at the other end to my carriage as a unit. Thus it will be readily apparent that my device is always a unitary structure whether the electrode is connected about the pipe or is freed at one end of the spring so that the whole unit may be removed from the pipe as a single unitary piece.

The foregoing describes my invention in its preferred aspects, and illustrates my invention by way of specific embodiments and specific examples, but alterations and modifications may be made thereof without departing from the invention herein disclosed and claimed.

Having described my invention, I claim:

1. An electrode for applying test voltage circumferentially to the surface of a coated pipe and adapted to travel therealong comprising a pair of rollers mounted on a bracket adapted to support a carrying means for an electrical apparatus supplying said test voltage and adapted to roll along the top of the coated pipe and apply test voltage to the surface of the coating over which said rollers roll, said bracket member extending between and supporting said rollers in spaced relation with the distance therebetween sufficient to stabilize said bracket against sidewise movement and only sufficient to allow said rollers to roll along the top of the pipe, means depending from said bracket for making electrical contact with the surface of the coated pipe between said rollers, and a helical coiled spring extending about said pipe from the outer end of one of said rollers to the outer end of the other of said rollers, each end of said coiled spring being connected to the outer end of each of said rollers respectively, and at least one of said connections being arranged for ready disconnection.

2. A device for carrying along the top of a pipe an electrical apparatus for supplying a test voltage for testing pipe coating for holidays and for applying test voltage to the surface of the pipe coating as the device is moved along the pipe comprising means on rollers adapted to roll along the top of a coated pipe and carry the electrical apparatus and electrode means adapted to extend around the circumference of said pipe between said rollers carried by said rollers and extending from the outer end of one to the outer end of the other for applying test voltage to the surface of the coating therebetween.

3. A device as defined in claim 2 in which said rollers and said electrode means are adapted to be connected together at the outer sides of said rollers and provide an electrode for applying test voltage completely around the circumference of the pipe from roller to roller as the device moves therealong.

4. A device as defined in claim 2 in which said electrode means comprises a coiled helical spring.

5. A device as defined in claim 2 in which said electrode means comprises a coiled helical spring one end of which is connected to the outer end of one of said rollers and the other end of which is connected to the outer end of the other of said rollers and between said rollers is adapted to extend about the pipe and make electrical contact with the surface of the coating between the rollers.

6. A device as defined in claim 5 in which at least one of the connections between one end of said spring and one end of said roller is readily disengageable.

7. A device for carrying along the top of a pipe an electrical apparatus for supplying a test voltage for testing pipe coating for holidays and for applying test voltage to the surface of the pipe coating as the device is moved along the pipe comprising a platform on rollers adapted to roll along the top of a coated pipe and to carry the electrical apparatus, a bracket member depending from one end of said platform between a pair of rollers and with said rollers supported on axles extending from said bracket, means depending from said bracket member between said roller for applying test voltage to the surface of the coating between the rollers, a coiled helical spring extending from the outer end of one roller to the outer end of the other roller and about said pipe for applying test voltage to the surface of said coating circumferentially about said pipe between the outer ends of said rollers, and slot means for disengagably connecting one end of said coiled spring to the outer portion of one of said rollers.

8. A device for carrying, along the top of a horizontally extending pipe, an electrical apparatus for supplying a test voltage for testing the coating of such a pipe for holidays and the electrode for applying test voltage circumferentially to the surface of the pipe coating as the device is moved therealong comprising a carrying means having a pair of rollers adapted to roll longitudinally along the top of said pipe displaced from one another circumferentially with respect to said pipe and an electrode means connected to the outer ends of each of said rollers and extending therebetween and adapted to travel therealong for applying test voltage circumferentially to the surface of said pipe between the outer ends of said rollers, and means for connecting said electrical test voltage to said rollers and to said electrode means, so that said rollers and said electrode means provide an electrode for applying test voltage completely around the circumference of the pipe as said device is moved therealong from the inner end and under one of said rollers, under said electrode means, and under the other of said rollers to the inner end thereof.

9. A device as defined in claim 8 in which said electrode means is substantially circular in cross-section.

10. A device as defined in claim 8 in which said electrode means is a helical spring.

11. A device as defined in claim 10 having means for selectively engaging or disengaging one end of said helical spring to the outer end of one of said rollers.

12. A device as defined in claim 8 having means for selectively engaging or disengaging one end of said electrode means to the outer end of one of said rollers.

13. A device as defined in claim 8 in which said rollers are supported by a bracket with a space between the inner ends thereof and means depends from said bracket for making electrical contact with the surface of the coated pipe between the inner ends of said rollers.

14. In an electrode for applying test voltage circumferentially to the surface of a coated pipe and adapted to travel therealong, means for engaging the top of the pipe to carry weight of the electrode and travel therealong, means adapted to extend from one outer side of said first mentioned means around the circumference of said pipe to the other side of said first mentioned means and means to connect each end of said second mentioned means to each of said outer sides.

LEO H. TINKER.

REFERENCES CITED

The following references are of record in the file of this patent:

UNITED STATES PATENTS

| Number | Name | Date |
| --- | --- | --- |
| 1,950,484 | Clarvoe | Mar. 13, 1934 |
| 2,332,182 | Stearns | Oct. 19, 1943 |
| 2,497,804 | Stearns | Feb. 14, 1950 |